US011181731B1

(12) United States Patent
Bumgardner et al.

(10) Patent No.: US 11,181,731 B1
(45) Date of Patent: Nov. 23, 2021

(54) WIDE FIELD OF VIEW (WFOV) OPTICAL SYSTEM AND METHOD

(71) Applicant: KOPIN CORPORATION, Westborough, MA (US)

(72) Inventors: Rodney Bumgardner, Beaverton, OR (US); Raymond T. Hebert, Florence, OR (US)

(73) Assignee: KOPIN CORPORATION, Westborough, MA (US)

( * ) Notice: Subject to any disclaimer, the term of this patent is extended or adjusted under 35 U.S.C. 154(b) by 100 days.

(21) Appl. No.: 15/859,779

(22) Filed: Jan. 2, 2018

Related U.S. Application Data

(60) Provisional application No. 62/441,548, filed on Jan. 2, 2017.

(51) Int. Cl.
*G02B 25/04* (2006.01)
*G02B 27/00* (2006.01)
(Continued)

(52) U.S. Cl.
CPC .............. *G02B 25/04* (2013.01); *G02B 3/04* (2013.01); *G02B 3/08* (2013.01); *G02B 25/001* (2013.01);
(Continued)

(58) Field of Classification Search
CPC .......... G02B 27/0172; G02B 6/0005; G02B 6/0008; G02B 6/06; G02B 6/08; G02B 17/0812; G02B 2027/011; G02B 2027/0132; G02B 27/0025; G02B 27/283; G02B 5/3083; G02B 27/00; G02B 27/01; G02B 27/28; G02B 5/30; G02B 25/04; G02B 3/04; G02B 25/001; G02B 3/08; G02B 27/0081; G02B 27/0037; F21V 8/00
See application file for complete search history.

(56) References Cited

U.S. PATENT DOCUMENTS

| 4,212,209 A | 7/1980 | Newbold |
| 5,151,823 A | 9/1992 | Chen |

(Continued)

*Primary Examiner* — Balram T Parbadia
(74) *Attorney, Agent, or Firm* — Peloquin, PLLC; Mark S. Peloquin, Esq.

(57) ABSTRACT

Systems and methods are described for a wide field of view (WFOV) optical doublet system. The system includes a first lens. The first lens has a first surface facing a viewer side of the system and a second surface facing away from the viewer side. The first lens has a positive refractive power. The system includes a second lens. The second lens has a first surface facing the first lens and a second surface facing away from the first lens. The second lens has a positive refractive power. The system includes a display panel. The display panel has a display surface facing the second surface of the second lens. The first lens, the second lens, and the display panel are configured in order from the viewer side along an optical axis of the system. Only one surface of either the first lens or the second lens is a diffractive surface and only two surfaces are Fresnel surfaces. In operation, light from an image displayed on the display surface enters the system through the second surface of the second lens and is magnified and presented in a system exit pupil. The system exit pupil is on the viewer side and a field of view presented to the viewer is at least eighty (80) degrees.

19 Claims, 13 Drawing Sheets

(51) Int. Cl.
*G02B 25/00* (2006.01)
*G02B 3/04* (2006.01)
*G02B 3/08* (2006.01)

(52) U.S. Cl.
CPC ..... *G02B 27/0037* (2013.01); *G02B 27/0081* (2013.01)

(56) References Cited

U.S. PATENT DOCUMENTS

| | | |
|---|---|---|
| 5,161,057 A | 11/1992 | Johnson |
| 5,347,400 A | 9/1994 | Hunter |
| 5,349,471 A * | 9/1994 | Morris ................ G02B 5/1876 359/565 |
| 5,926,318 A | 7/1999 | Hebert |
| 6,282,034 B1 | 8/2001 | Onishi |
| 6,437,767 B1 | 8/2002 | Cairns |
| 6,774,871 B2 | 8/2004 | Birdwell |
| 6,972,735 B2 | 12/2005 | Hebert |
| 7,009,581 B2 | 3/2006 | Birdwell |
| 10,215,890 B2 * | 2/2019 | Perreault ............ G02B 27/0025 |
| 2004/0141241 A1* | 7/2004 | Claytor ................... G02B 3/08 359/742 |
| 2010/0246006 A1* | 9/2010 | Suzuki ............... G02B 27/4216 359/570 |
| 2012/0120498 A1* | 5/2012 | Harrison ........... G02B 27/0093 359/630 |
| 2013/0100511 A1* | 4/2013 | Yamamoto ........... G03H 1/2205 359/9 |
| 2017/0108702 A1* | 4/2017 | Rabner ................ G02B 27/027 |
| 2017/0255015 A1* | 9/2017 | Geng ................... G02B 6/0008 |
| 2017/0357100 A1* | 12/2017 | Ouderkirk ............. F21V 5/02 |
| 2018/0081092 A1* | 3/2018 | Hudman ............ G02B 25/001 |
| 2019/0072763 A1* | 3/2019 | Matsumoto ........ G02B 27/0037 |
| 2019/0227305 A1* | 7/2019 | Fortin-Desch nes .... G02B 3/08 |

* cited by examiner

System/Prescription Data

Title: WFOV_80_Degree_Fresnel_Prescription
Date : 12/28/2016

GENERAL LENS DATA:

Effective Focal Length    : 20.6
Paraxial Image Height     : 17.44

Maximum Radial Field      : 40 degrees
Primary Wavelength        : 0.587 μm
Lens Units                : Millimeters

SURFACE DATA SUMMARY:

| Surf | Type | Radius | Thickness | Glass | Diameter | Conic | Comment |
|---|---|---|---|---|---|---|---|
| 3 | STANDARD | 33 | 8 | ZEOREX_E48R | 42 | -2.5 | lens 1 |
| 4 | FRESNELS | -50 | 2 | | 42 | 0.1 | |
| 5 | BINARY_2 | 55 | 2 | ZEOREX_E48R | 42 | -.100 | lens 2 |
| 6 | XFRESNEL | 60 | 16.5 | | 42 | -100 | |

SURFACE DATA DETAIL:

Surface   3 STANDARD lens 1
Maximum Radius          : 21

Surface   4 FRESNELS
Coefficient on r^ 2     : -3.83e-005
Coefficient on r^ 4     :  -4e-005
Coefficient on r^ 6     : 1.74e-007
Coefficient on r^ 8     : -6.07e-010

Page 1

```
Term on Fresnel r^8    :    1.86e-010
Term on Fresnel r^10   :   -2.69e-013
Term on Fresnel r^12   :    1.59e-016
Term on Fresnel r^14   :    3.8e-020
Maximum Radius         :    21

Surface   7 STANDARD cvr glass
Surface IMA STANDARD display
``` page 3

WIDE FIELD OF VIEW (WFOV) OPTICAL SYSTEM AND METHOD

RELATED APPLICATIONS

This patent application claims priority from U.S. Provisional Patent Application titled "WIDE FIELD OF VIEW (WFOV) OPTICAL SYSTEM," filed on Jan. 2, 2017, Ser. No. 62/441,548. U.S. Provisional Patent Application Ser. No. 62/441,548 is hereby incorporated by reference.

BACKGROUND OF THE INVENTION

1. Field of Invention

The invention relates generally to wide field of view (WFOV) optical systems and more specifically to compact wide field of view optical systems utilizing refractive and diffractive optical elements.

2. Art Background

Wide field of view (WFOV) optical systems are used in eyepieces of headsets (binocular) or in a monocular where an image is displayed to a user. The WFOV optical system includes an eyepiece and an image display panel. The function of the eyepiece is to receive light from the display panel, magnify its field of view, and then present an image to the user formed from light directed to a system exit pupil of the optical system. The user places her eye at the location of the system exit pupil in order to see the image. The distance from the lens surface closest to the user and the user's eye is referred to as the eye relief of the eyepiece. The system exit pupil must be located at a sufficient distance from the lens surface so that the user does not interfere with the lens surface through contact, such as for example eye lash contact. Thus, eyepiece designers are faced with the task of simultaneously providing a large field of view, sufficient unobtrusive eye relief, and well corrected aberrations. The requirements for a wide field of view eyepiece are often in conflict with each other. This can present a problem.

For example, a long eye relief and well corrected aberrations come into conflict with increasing field angle. This can present a problem. As the eye relief is maintained for increasing field angle, the aperture sizes of the lens elements are sometimes increased, which can aggravate the aberration correction. This can present a problem. It is difficult to make an eyepiece with a wide field of view (WFOV), a long eye relief, a compact overall optical system length and well corrected for aberrations all at the same time. This can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIGS. 9A, 9B, 9C, and 9D illustrate system/prescription data for the optical doublet system illustrated in FIG. 2, according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Systems and methods are described for providing a compact wide field of view (WFOV) optical system that presents a magnified image of a display to a user. In various embodiments, the WFOV optical system can be used by a user in a monocular or a binocular device. Embodiments of a display device can be adapted to use in a binocular for a virtual reality (VR) headset.

Figure 1:
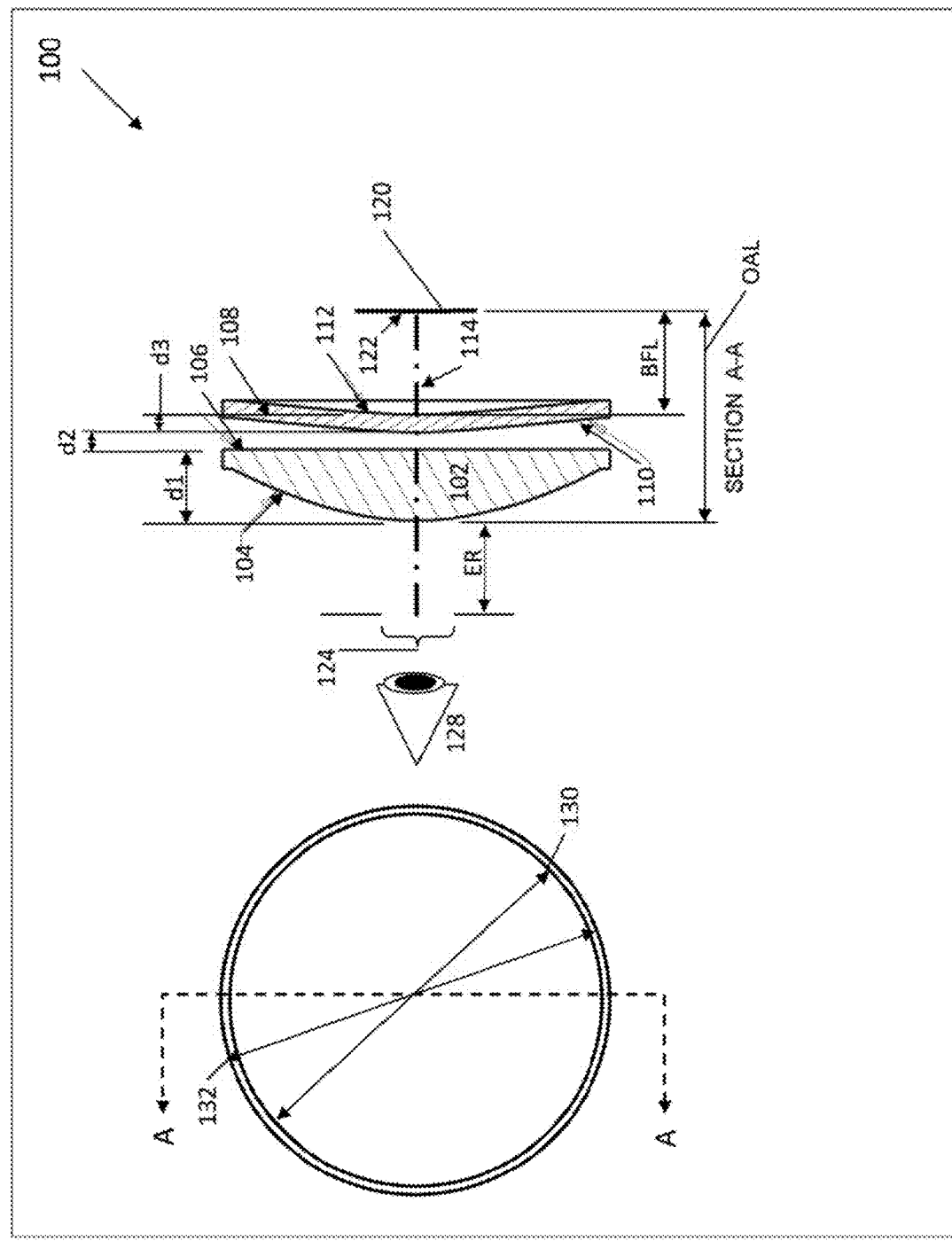
FIG. 1 illustrates a wide field of view (WFOV) optical doublet system according to embodiments of the invention.

FIG. 1 illustrates, generally at 100, a wide field of view (WFOV) optical doublet system according to embodiments of the invention. With reference to FIG. 1 an optical doublet system 100 is illustrated in a front view with lens diameter 130 and lens shoulder diameter 132. A cross-sectional view is indicated at A-A. The optical doublet system 100 includes a first lens 102, a second lens 108, and a display panel 120 all of which are centered on a common optical axis 114. The display panel 120 is configured to receive an electronic input signal (not shown) that causes an image to be displayed on a display screen 122 of the display panel 120. In operation, light radiated from points on an image displayed on the display screen 122 is angularly magnified by the system 100 through a system exit pupil 124 to form an image on the retina of a viewer's eye (user) at 128. The optics form a nearly collimated bundle of rays for each field point to be focused by the user's eye to form an image on the user's retina. The WFOV optical doublet system 100 is referred to herein in various interchangeable ways, such as, the system, the optical system, the optical doublet system, the WFOV optical doublet system, etc. All such references will be understood to refer to the same system and no limitation is implied by using one term in place of the other term.

As used in this description of embodiments, a viewer side means in the direction of the viewer 128 and away from the viewer side means in the direction of the display panel 120. Thus, each lens element has two surfaces, one surface that faces the viewer side of the system and the other surface that faces away from the viewer side of the system.

The first lens 102 has a first surface 104 facing a viewer side of the system 100 and a second surface 106 facing away from the viewer side of the system 100. The second lens 108 has a first surface 110 that faces the viewer side of the system 100 and a second surface 112 that faces away from the viewer side of the system 100.

The first lens 102 has a center thickness indicated by d1. The second lens 108 has a center thickness indicated by d3. The first lens 102 is separated from the second lens 108 by a distance d2. The display panel 120 is separated from the second surface 112 of the second lens 108 by a distance indicated by BFL which indicates the back focal length of the system 100.

The system 100 is a compact optical system and has an overall optical system length indicated by OAL which is measured from the center thickness of the front surface 104 of the first lens 102 to the display surface 122 of the display panel 120. The OAL is equal to the sum of d1 plus d2 plus d3 plus BFL. The system exit pupil 124 is a region at the intended location for the user eye where the image quality is within design parameters. The system exit pupil is located at an eye relief distance of the system 100 which is indicated by a distance ER. Therefore, when a user looks into the eyepiece, by moving the user's eye 128 proximate to the system exit pupil 124 and in alignment with the optical axis 114, the image can be observed at the design level for the image quality. Viewing the image off the optical axis results in degraded image quality which increases in degradation the further the user 128 moves his or her eye away from the optical axis.

The design process, for various embodiments of the invention, is executed and optimized in reverse to optimize modulation transfer function (MIT) and other performance factors at the plane of the display in a way that is compatible with the display dimensions and pixel size.

The eyepiece of the optical doublet system 100 contains four separate optical surfaces using the two lenses, i.e., the first lens 102 and the second lens 108. Of the four optical surfaces, two surfaces are Fresnel surfaces and one surface is a diffractive surface. Both the first lens 102 and the second lens 108 are positive power lenses. In various embodiments, the combination of the four surfaces, of which two are Fresnel surfaces, reduces the overall weight and size of the optical system thereby obtaining a compact optical doublet system. In the implementations used in embodiments of the invention for the optical doublet, the Fresnel surfaces provide positive optical power using reduced center thickness lenses. Note that the second surface 106 of the first lens 102 provides positive optical power while being a Plano surface. The Plano Fresnel surface saves weight and optical system length by providing positive optical power with a surface that does not have a base curvature, i.e., a "flat" surface.

In one embodiment, the four surfaces of the two-lens doublet eyepiece are arranged in the following order. The first surface 104 of the first lens 102 is a convex aspherical surface. The second surface 106 of the first lens 102 is Plano with Fresnel. The first surface 110 of the second lens 108 is convex aspherical with diffractive for color correction. The second surface 112 of the second lens 108 is concave with Fresnel. The Fresnel treatment of the second surface 112 is referred to as an extended Fresnel in some embodiments. In one or more embodiments, each of the four surfaces makes a positive power contribution to the optical power provided by system 100 to the light radiated from the display screen 122.

The optical doublet system 100 is scalable and can be sized to accommodate different sizes of display panel 120. In various embodiments, the system can be scaled by maintaining one or more or all of the following relationships to provide a wide field of view to a viewer:

(1) A sum of d1+d2+d3≈0.58FL, where FL is the effective forward focal length of the system and the symbol "≈" means approximately equal to.

(2) OAL≈1.4FL, where OAL is the overall optical system length and FL is the effective forward focal length of the system.

(3) OAL≈1.7BFL, where OAL is the overall optical system length and BFL is the back focal length of the system.

In various embodiments, the optical doublet eyepiece can be incorporated into different optical devices such as a monocular or binocular to provide a wide field of view to a user that can be as much as eighty degrees or more. Embodiments employing the optical doublet system described herein can be incorporated into headsets and in some embodiments the headset is a headset used to display a virtual reality (VR) visual image environment to a viewer.

Figure 2:
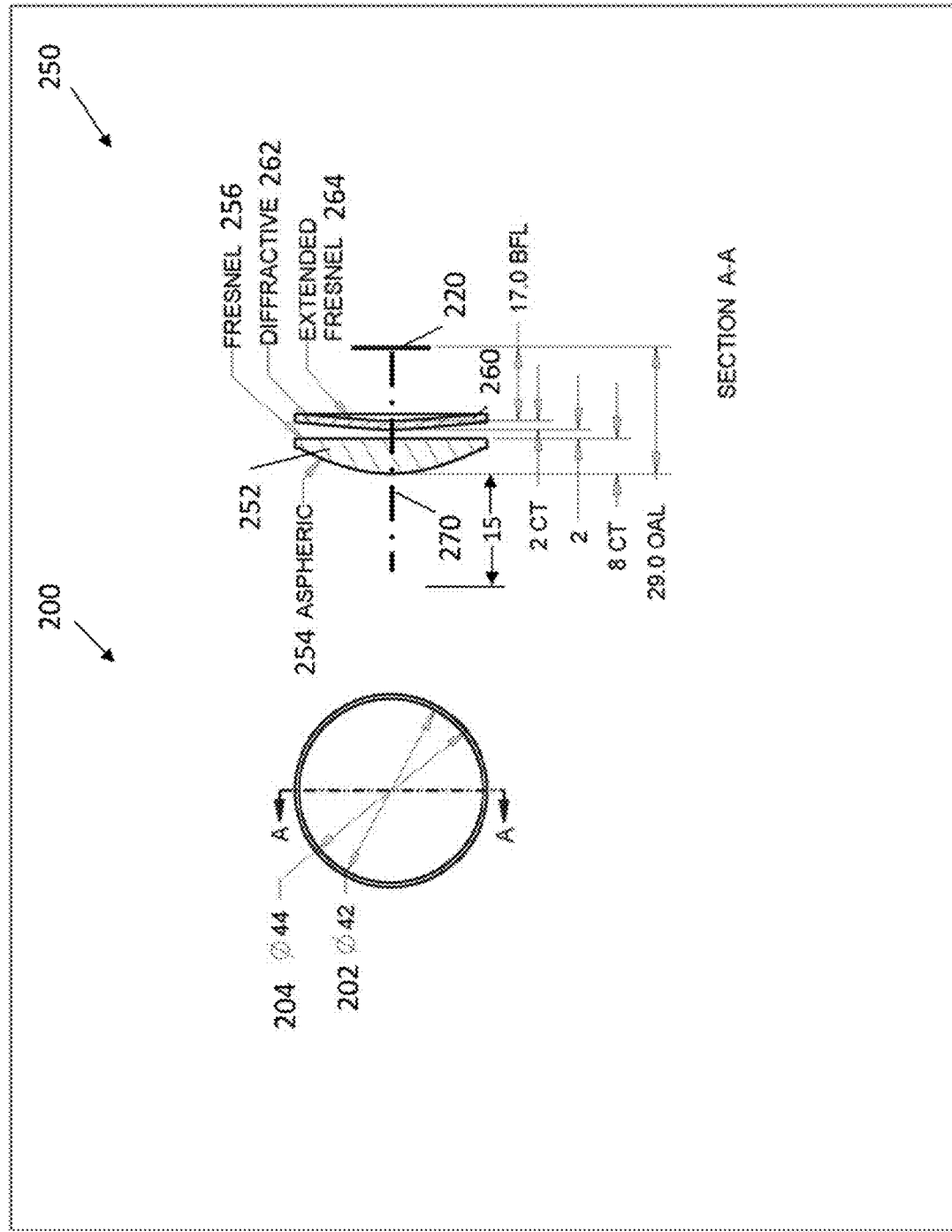
FIG. 2 illustrates a WFOV optical doublet system adapted to an eyepiece with lens diameters of 42 millimeters, according to embodiments of the invention.

FIG. 2 illustrates a WFOV optical doublet system adapted to an eyepiece with lens diameters of 42 millimeters, according to embodiments of the invention. With reference to FIG. 2, an end view is illustrated at 200. Section A-A, from end view 200, is illustrated in a cross-sectional view at 250. In the embodiment illustrated in FIG. 2, a diameter of the first lens is 42 millimeters and a diameter of second lens is 42 millimeters. Both the first lens and the second lens have lens mounting shoulder outer diameters of 44 millimeters.

The eyepiece is constructed with two lenses. A first lens 252 has a first surface 254 which faces a viewer side of the eyepiece. The first lens 252 has a second surface 256 that faces away from the viewer side of the eyepiece. A second lens 260 has a first surface 262 facing the viewer side of the eyepiece and a second surface 264 facing away from the viewer side of the eyepiece. Both the first lens 252 and the second lens 260 along with a display panel 220 are configured with their respective centers aligned with the optical axis 270 of the system.

In one or more embodiments, the two lenses are arranged in order as shown in FIG. 2, where the first surface 254 of the first lens 252 is a convex aspherical surface that provides positive optical power. The second surface 256 of the first lens 252 is a Plano Fresnel surface that provides positive optical power. The first surface 262 of the second lens 260 is a diffractive convex aspherical surface that provides positive optical power. The second surface 264 of the second lens 260 is a concave aspherical surface with Fresnel that provides positive optical power. In some embodiments, the second surface 264 of the second lens 260 is a concave aspherical surface with Fresnel (extended Fresnel). The first lens 252 has a center thickness of eight (8) millimeters, the second lens 260 has a center thickness of two (2) millimeters and a spacing between the first lens 252 and the second lens 260 is two (2) millimeters. The back focal length (BFL) of the system is seventeen (17) millimeters. An overall optical length (OAL) of the system is twenty-nine (29) millimeters. An eye relief is fifteen (15) millimeters. The system has an effective forward focal length (FL) of 20.6 millimeters. In FIG. 2 the symbol "CT" is used in indicate center thickness of a lens. The display panel 220 is configured with a square shape having a diagonal dimension of 25 millimeters and an edge dimension of 17.69 millimeters. The display panel is configured to provide a 2000 pixel by 2000 pixel full color image display. The specific dimensions described herein with respect to FIG. 2 are given merely as an example and do not limit embodiments of the invention. As described above, the invention is scalable to other dimensions.

Figure 3:
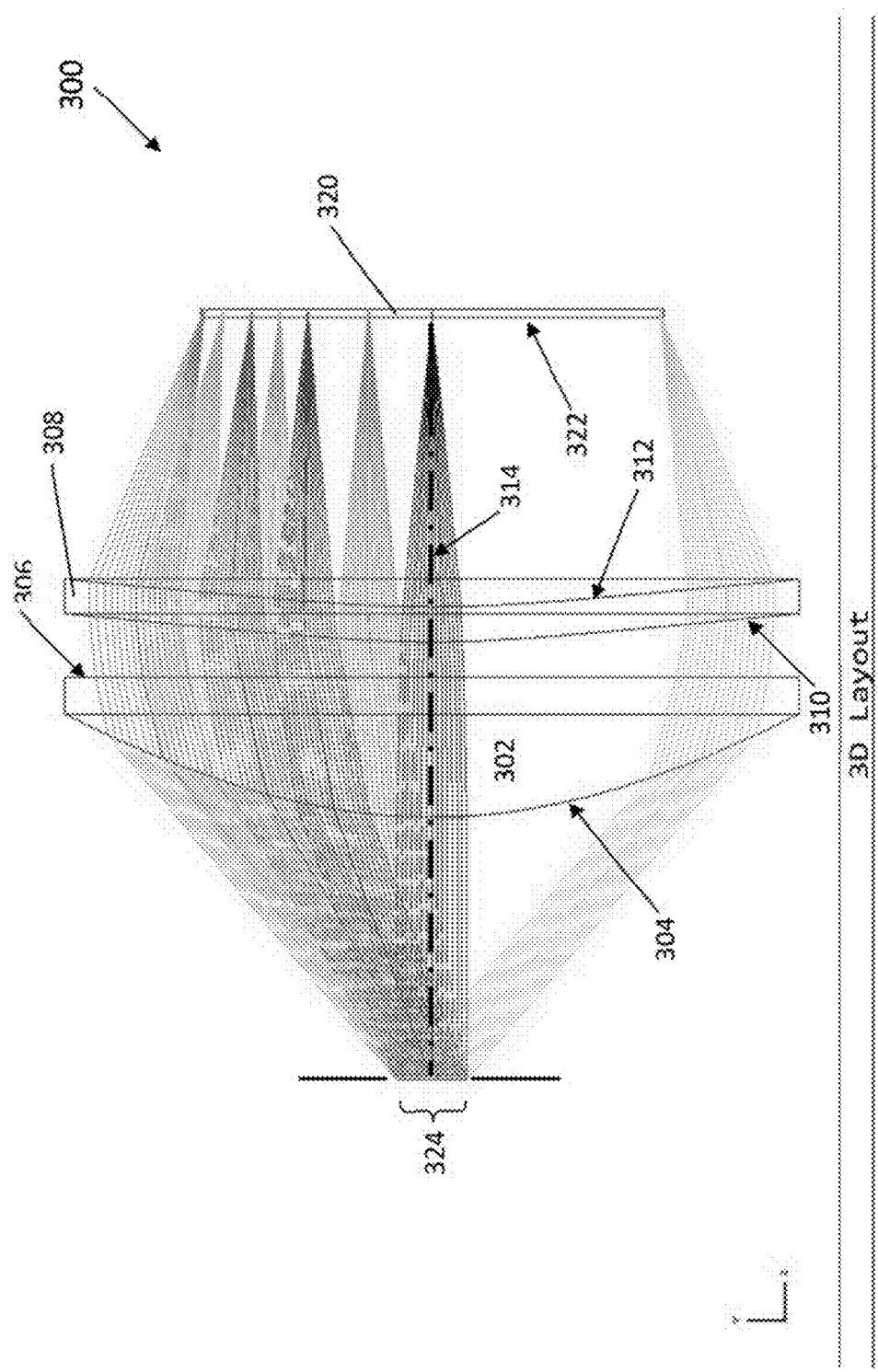
FIG. 3 illustrates a ray trace layout of the optical system of FIG. 2, according to embodiments of the invention.

FIG. 3 illustrates, generally at 300, a ray trace layout of the optical system of FIG. 2, according to embodiments of the invention. The horizontal axis is indicated with letter Z, the vertical axis is indicated with letter Y and the X axis is into the plane of the figure. With reference to FIG. 3, a first lens 302, a second lens 308 and a display panel 320 are configured with their respective centers coincident with an optical axis 314 of the optical system 300. The display panel 300 radiates light from a display screen 322, the light is indicated in a representative way by the colored bundles of rays, each representing a field point on the display surface. The light enters a second surface 312 of the second lens 308. All four surfaces 312, 310, 306, and 304 provide positive optical power. A viewer, not shown in FIG. 3, can view the image when looking through the system exit pupil 324. In one or more embodiments, the first surface 304 of the first lens 302 is a convex aspherical surface. The second surface 306 of the first lens 302 is a Piano surface with Fresnel. The first surface 310 of the second lens 308 is a convex diffractive surface and the second surface 312 of the second lens 308 is a concave aspherical surface with Fresnel (extended Fresnel). In some embodiments the second surface 312 is not extended Fresnel.

In various embodiments of the doublet eyepiece, the optical power is developed by the combined effects of the positive refractive power of the first lens and the second lens and the surfaces created on each lens, for example the Fresnel structures. Note that the arrangement of the four surfaces of the doublet eyepiece can be configured differently in different embodiments while keeping at least two surfaces out of the four surfaces as Fresnel and at least one surface out of the four surfaces as diffractive. In other words, the Fresnel surfaces can be moved to different locations in the optical doublet eyepiece and the diffractive surface can be moved to different locations in the optical doublet eyepiece. For example, the second surface 310 of the second lens 308 can be provided as a Fresnel surface. The second surface 306 of the first lens 302 can be provided as an extended Fresnel by providing a base curvature to the second surface 306, for example, by making the second surface 306 concave. The diffractive surface could be moved to the second surface 306 of the first lens 302 and the first surface 310 of the second lens 308 can be provided as a Fresnel surface. The first surface of the first lens is provided as an aspherical convex surface to provide positive refractive optical power while providing a robust surface that is resistant to damage through use by the viewer. In some embodiments, a diffractive or a Fresnel can be provided on the first surface 304 of the first lens 302. Thus, many different combinations of surfaces and lenses can be used in the doublet eyepiece within the teachings of embodiments of the invention. The discussion presented herein with respect to the performance and prescription of an eyepiece design are provided merely for illustration and no not limit embodiments of the invention.

With respect to the diffractive surface, all of the optical plastics used in the doublet system, e.g., for the first lens, the second lens, etc. have their own index of refraction and chromatic dispersion. The diffractive surface is used to correct for whatever residual chromatic aberration remains after the nominal basic refractive lens design is in place for a given embodiment.

Figure 4:
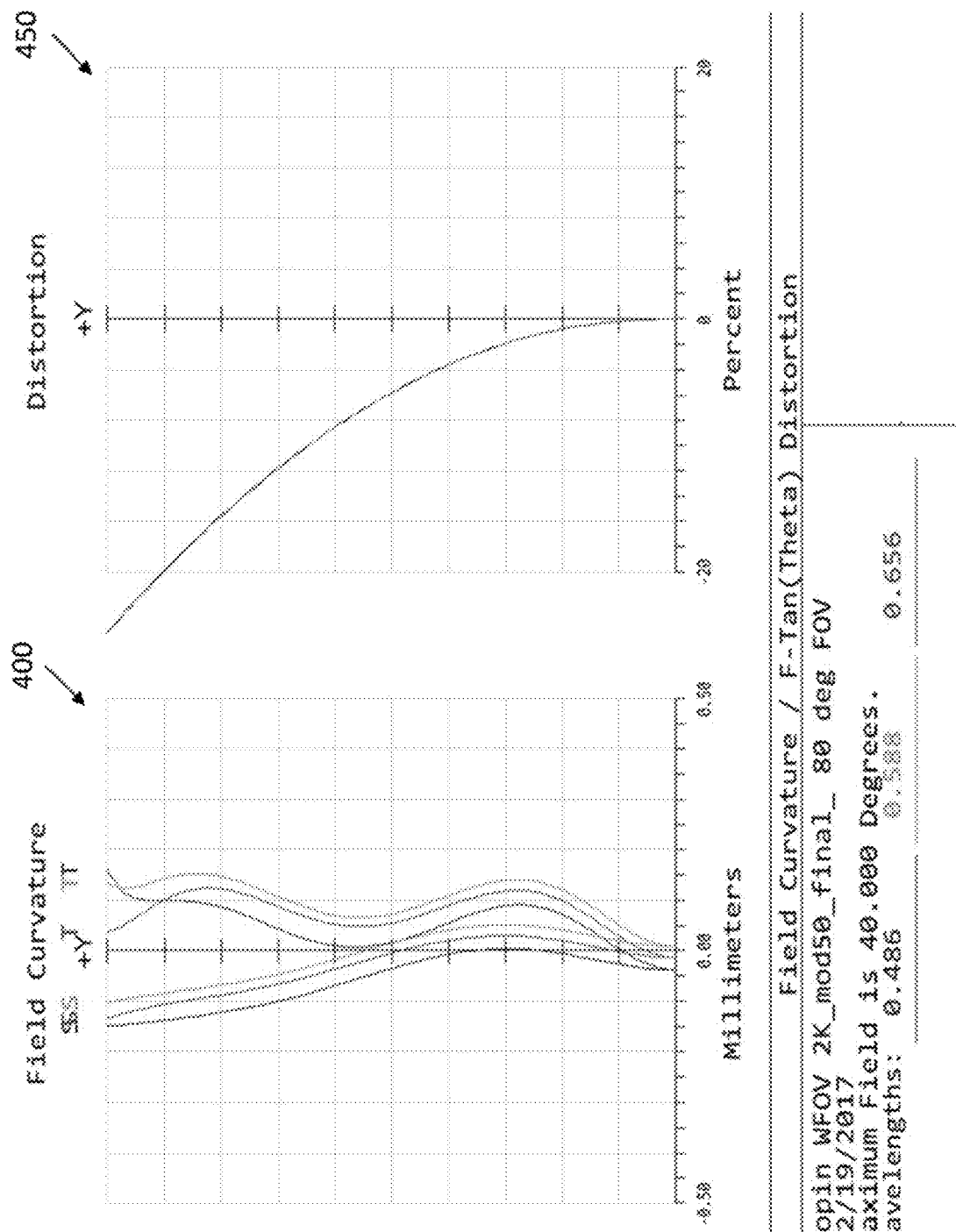
FIG. 4 illustrates field curvature and distortion performance data from the optical doublet system of FIG. 2, according to embodiments of the invention.

FIG. 4 illustrates curvature and distortion performance data produced by the optical doublet system of FIG. 2, according to embodiments of the invention. With reference to FIG. 4 curvature of the field of view is plotted with plus or minus 0.5 millimeters full scale on the horizontal axis and zero to 40 degrees on the vertical axis, thereby providing a half field of view in the vertical direction. Three different optical wavelengths are plotted, i.e., 0.486 um (blue), 0.588 um (green), and 0.656 um (red) with S indicating Sagittal (Y axis) and T indicating Tangential (X axis). The graph at 400 displays filed curvature in the Y Z plane. The diffractive surface within the doublet system has reduced the magnitude of the chromatic dispersion thereby creating less difference between the field curvature values displayed in 400 for the red, blue, and green wavelengths.

Distortion is plotted in 450, where the half field of view is plotted along the vertical axis Y and plus or minus 20 percent distortion is plotted along the horizontal axis. The distortion values for the three different wavelengths virtually overlay each other. In the case of the WFOV optical doublet system, design tradeoffs have been made to sacrifice distortion performance in order to maximize resolution as will be seen in the modulation transfer function plots in FIG. 5, FIG. 6, and FIG. 7 below. The distortion of the system is of the pin cushion type. This distortion is removed from the image displayed to a viewer in the system exit pupil by pre-processed the image with a barrel distortion to compensate for the pin cushion distortion such that when the image is finally displayed to the viewer the pin cushion distortion has been removed.

Figure 5:
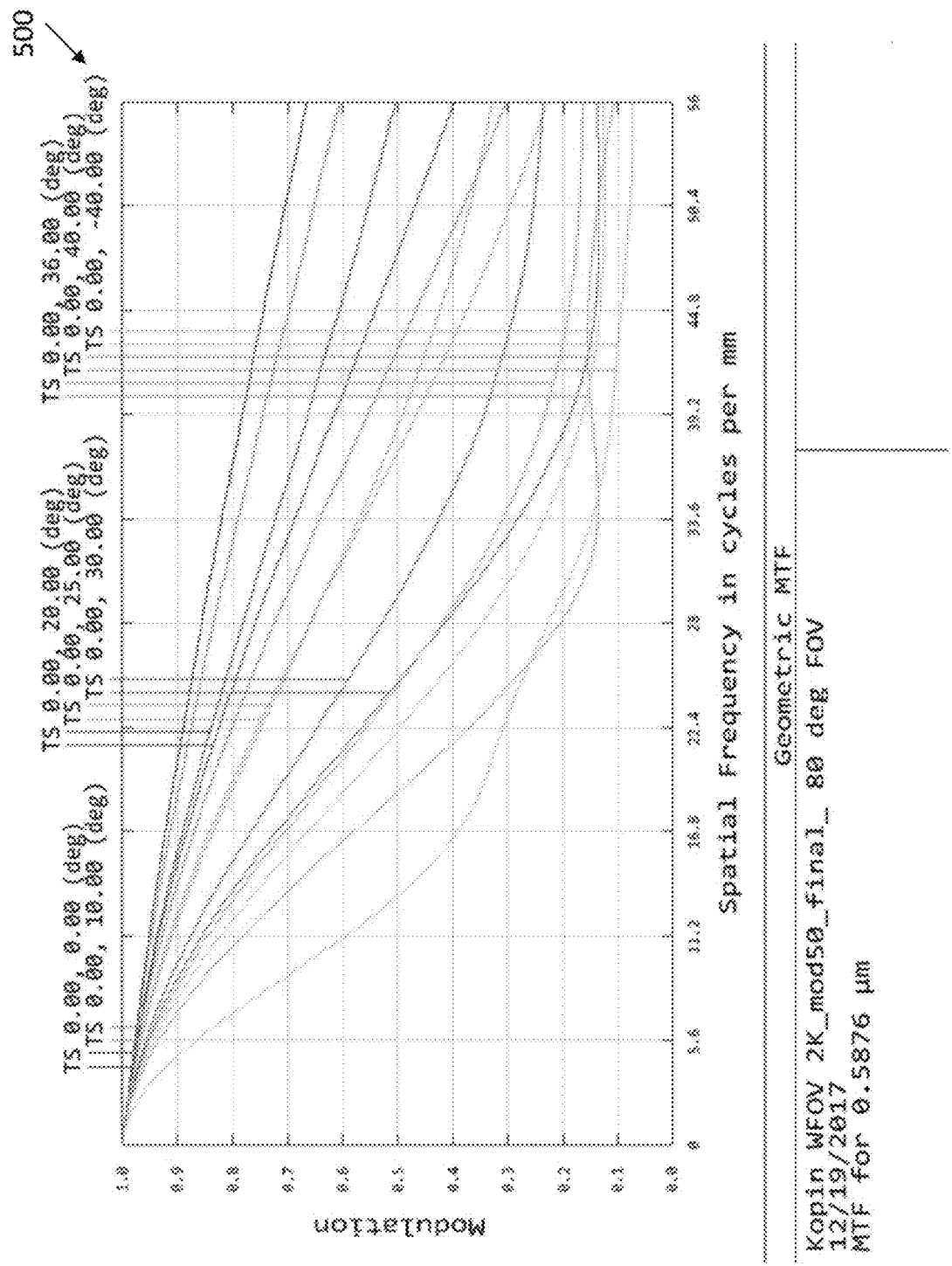
FIG. 5 illustrates modulation transfer function (MTF) data (for a wavelength of 0.5876 um and a system exit pupil cropped to 4 millimeters) from the optical doublet system illustrated in FIG. 2, according to embodiments of the invention.

FIG. 5 illustrates modulation transfer function (MTF) data (for an optical wavelength of 0.5876 um and a system exit pupil cropped to 4 millimeters) from the optical doublet system illustrated in FIG. 2, according to embodiments of the invention. With reference to FIG. 5 Tangential (T) and Sagittal (S) MTF data are plotted at listed angles relative to the optical axis. As the view position increases from 0 degrees to +40 degrees or from 0 to −40 degrees the value of the modulation transfer function decreases which indicates a degradation in the resolution of the image.

Figure 6:
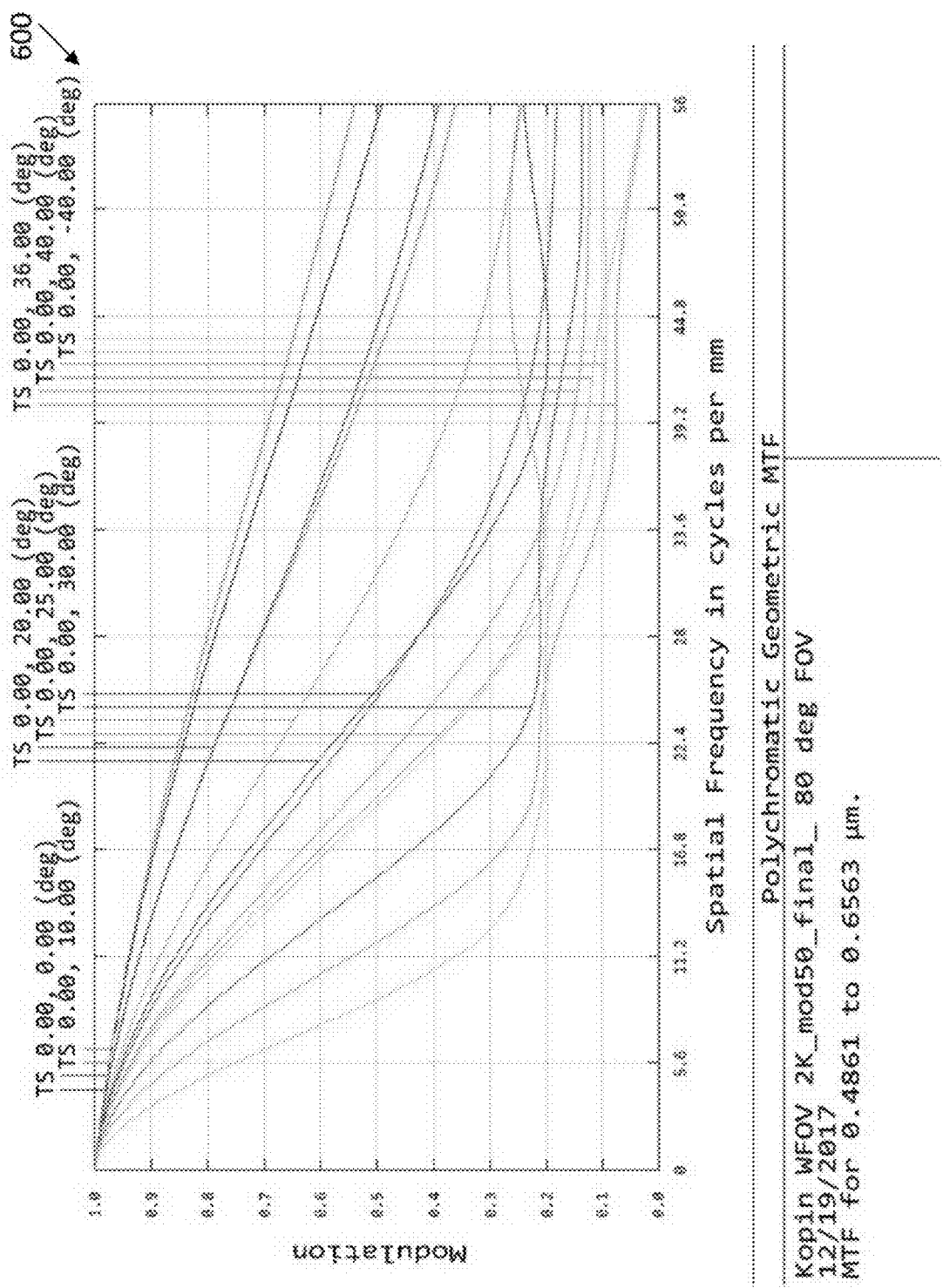
FIG. 6 illustrates a polychromatic modulation transfer function (MIT) (wavelengths within the range of 0.4861 to 0.6563 um and a system exit pupil cropped to 4 millimeters) from the optical doublet system illustrated in FIG. 2, according to embodiments of the invention.

FIG. 6 illustrates a polychromatic modulation transfer function (MTF) (optical wavelengths within the range of 0.4861 to 0.6563 um and a system exit pupil cropped to 4 millimeters) from the optical doublet system illustrated in FIG. 2, according to embodiments of the invention. With reference to FIG. 6 Tangential (T) and Sagittal (S) data are plotted at listed angles relative to the optical axis. As the view position increases from 0 degrees to 40 degrees or from 0 to −40 degrees the value of the modulation transfer function decreases which indicates a degradation in the resolution of the image.

Figure 7:
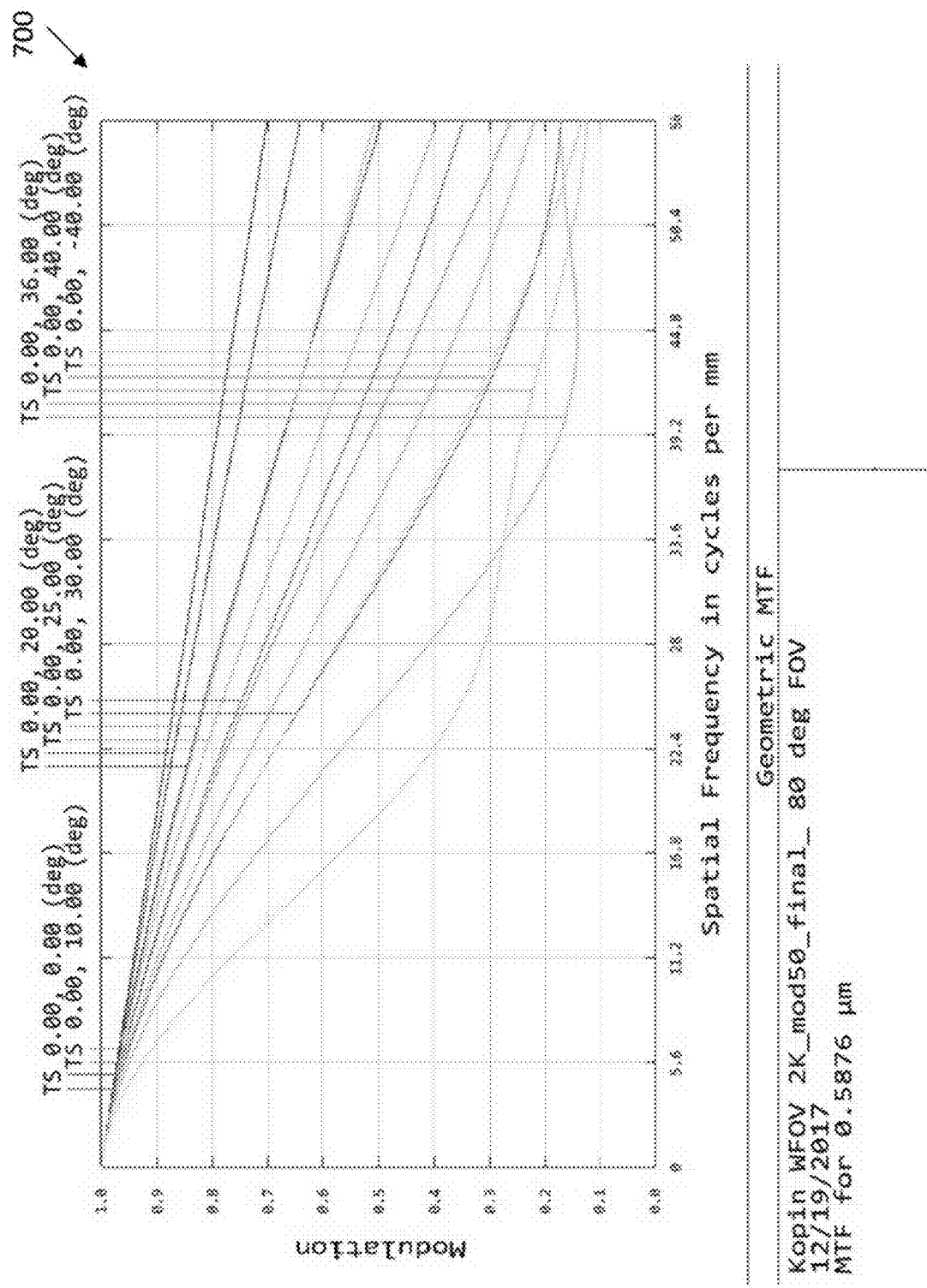
FIG. 7 illustrates modulation transfer function (MTF) data (for a wavelength of 0.5876 um and a system exit pupil cropped to 3 millimeters) from the optical doublet system illustrated in FIG. 2, according to embodiments of the invention.

FIG. 7 illustrates modulation transfer function (MTF) data (for an optical wavelength of 0.5876 um and a system exit pupil cropped to 3 millimeters) from the optical doublet system illustrated in FIG. 2, according to embodiments of the invention. With reference to FIG. 7 Tangential (T) and Sagittal (S) data are plotted at listed angles relative to the optical axis. As the view position increases from 0 degrees to +40 degrees or from 0 to −40 degrees the value of the modulation transfer function decreases which indicates a degradation in the resolution of the image. FIG. 7 illustrates a performance improvement at the smaller pupil diameter of 3 mm (FIG. 7) verses 4 mm (FIG. 5).

Figure 8:
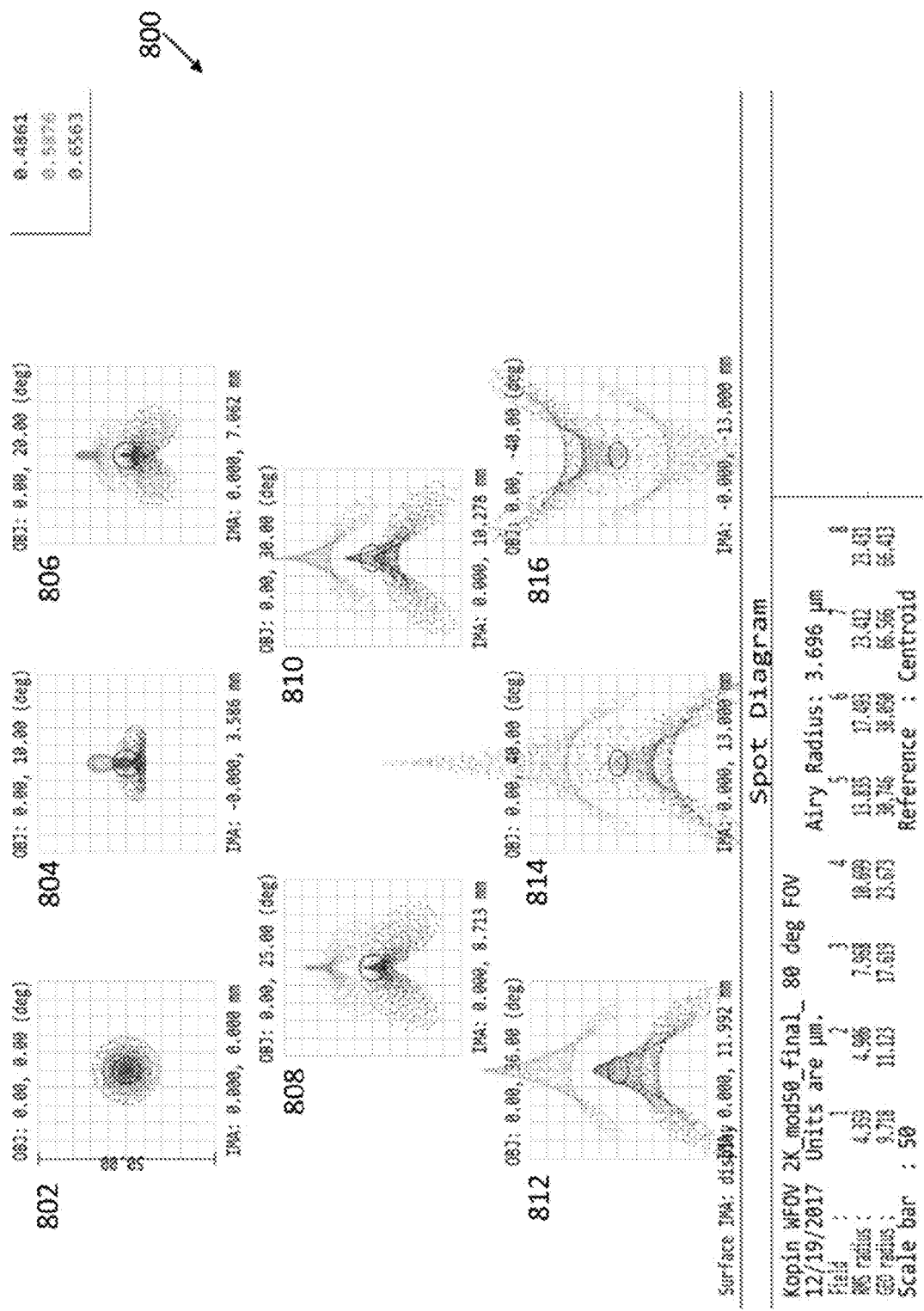
FIG. 8 illustrates spot diagram data (for wavelengths within the range of 0.4861 to 0.6563 um and a system exit pupil cropped to 4 millimeters) from the optical doublet system illustrated in FIG. 2, according to embodiments of the invention.

FIG. 8 illustrates spot diagram data (for wavelengths within the range of 0.4861 to 0.6563 um and a system exit pupil cropped to 4 millimeters) from the optical doublet system illustrated in FIG. 2, according to embodiments of the invention. With reference to FIG. 8, spot diagrams are provided where the horizontal X axis and the vertical Y axis represent the nominal focal plane. The three different optical wavelengths 0.4861 um (blue), 0.5876 um (green), and 0.6563 um (red) are indicated at various positions within the field of view for the spot diagrams of FIG. 8. A spot diagram at 802 is on the optical axis at zero degrees. At 804 the viewing position is at +10 degrees. At 806 the viewing position is at +20 degrees. At 808 the viewing position is at +25 degrees. At 810 the viewing position is at +30 degrees. At 812 the viewing position is at +36 degrees. At 814 the viewing position is at +40 degrees. At 816 the viewing position is at −40 degrees.

FIGS. 9A, 9B, 99C, and 9D illustrate system/prescription data for the optical doublet system illustrated in FIG. 2, according to embodiments of the invention. With reference to FIG. 9A through FIG. 9D collectively, the data shown for each surface is used with equation (1), directly below, to obtain the curvature of a given surface:

$$Z=(Cr^2/1+\text{sqrt}(1-(1+k)C^2r^2))+A1r^2+A2r^4+A3r^6+A4r^8+A5r^{10}\ldots A8r^{16} \quad (1)$$

Where Z=sag (or Sagitta) of a surface from the vertex and parallel to the optical axis; r=radial distance from the optical axis; C=curvature (i.e., inverse of radius of curvature); k=conic constant; and A4, A6, A8 . . . =4th, 6th, 8th . . . order aspheric coefficients.

The Surface Data Summary lists data for surface numbers where surface numbers 3, 4, 5, and 6 correspond with the first and the second surfaces of the first lens and the second lens described above in conjunction with FIG. 2 and FIG. 3. The lens material for the first and second lens is listed as ZEONEX_E48R which is a moldable optical plastic. Other lens materials may be used with design modifications and the lens material listed is given merely for an illustration of one or more embodiments and is not limiting.

Surface number 3 is an aspherical surface characterized in part with a radius of curvature (i.e., inverse of curvature C) of 33 millimeters, a center thickness of 8 millimeters, and a diameter of 42 millimeters. Surface number 3 corresponds with the first surface 254 of the first lens 252 (FIG. 2) and also the first surface 304 of the first lens 302 (FIG. 3).

Surface number 4 is a base piano surface with superimposed Fresnel facets as characterized in part with a radius of curvature of −50 millimeters, thickness of 2 millimeters, and a diameter of 42 millimeters. The Fresnel surface is characterized with the $r^2$ through $r^{1t}$ coefficients and Equation (1) above, but with the sags "Z" of each Fresnel facet collapsed onto the nominal piano base surface. Surface number 4 corresponds to the second surface 256 of the first lens 252 (FIG. 2) and also to the second surface 306 of the first lens 302 (FIG. 3).

Figure 9B:
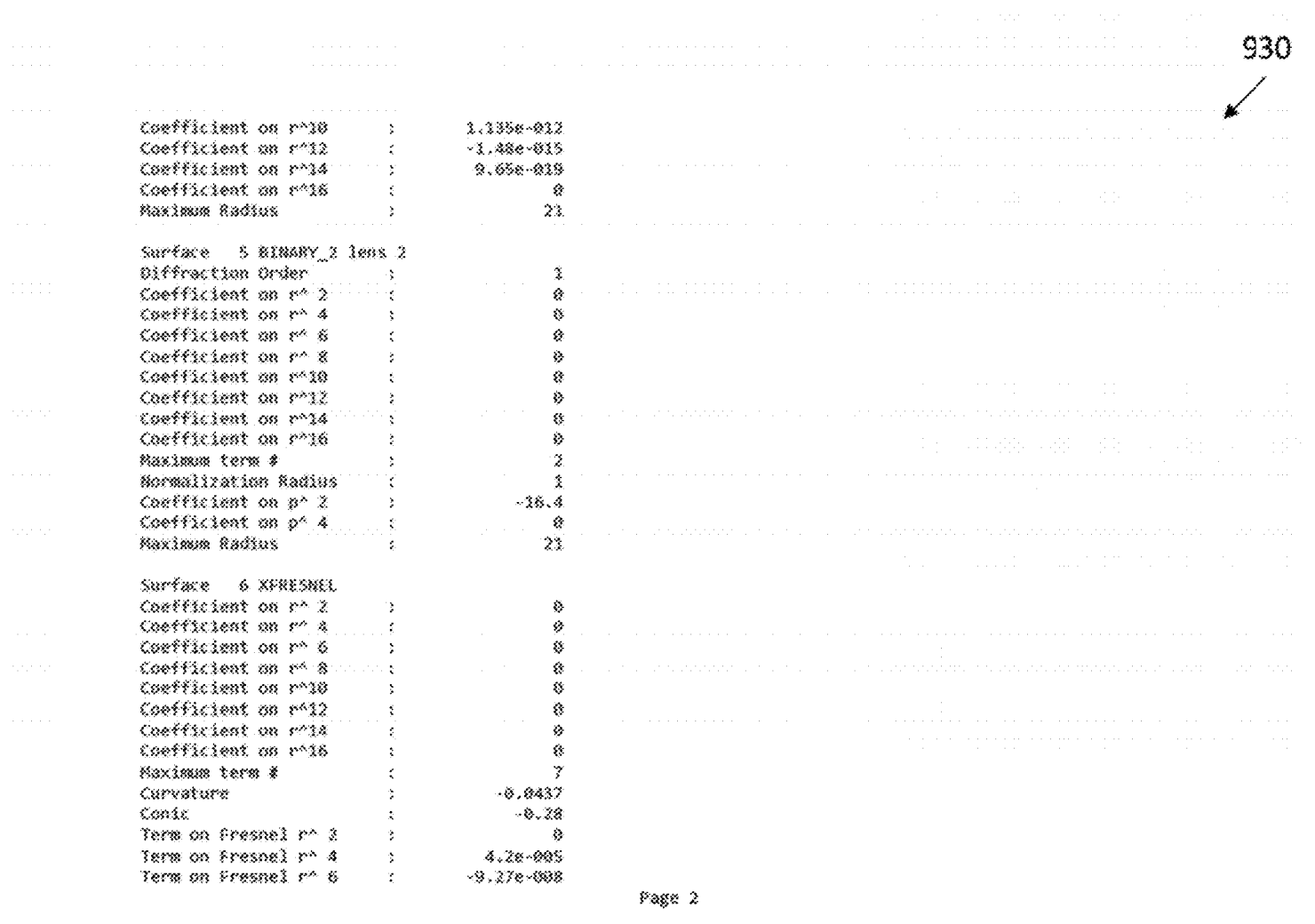
Figure 9D:
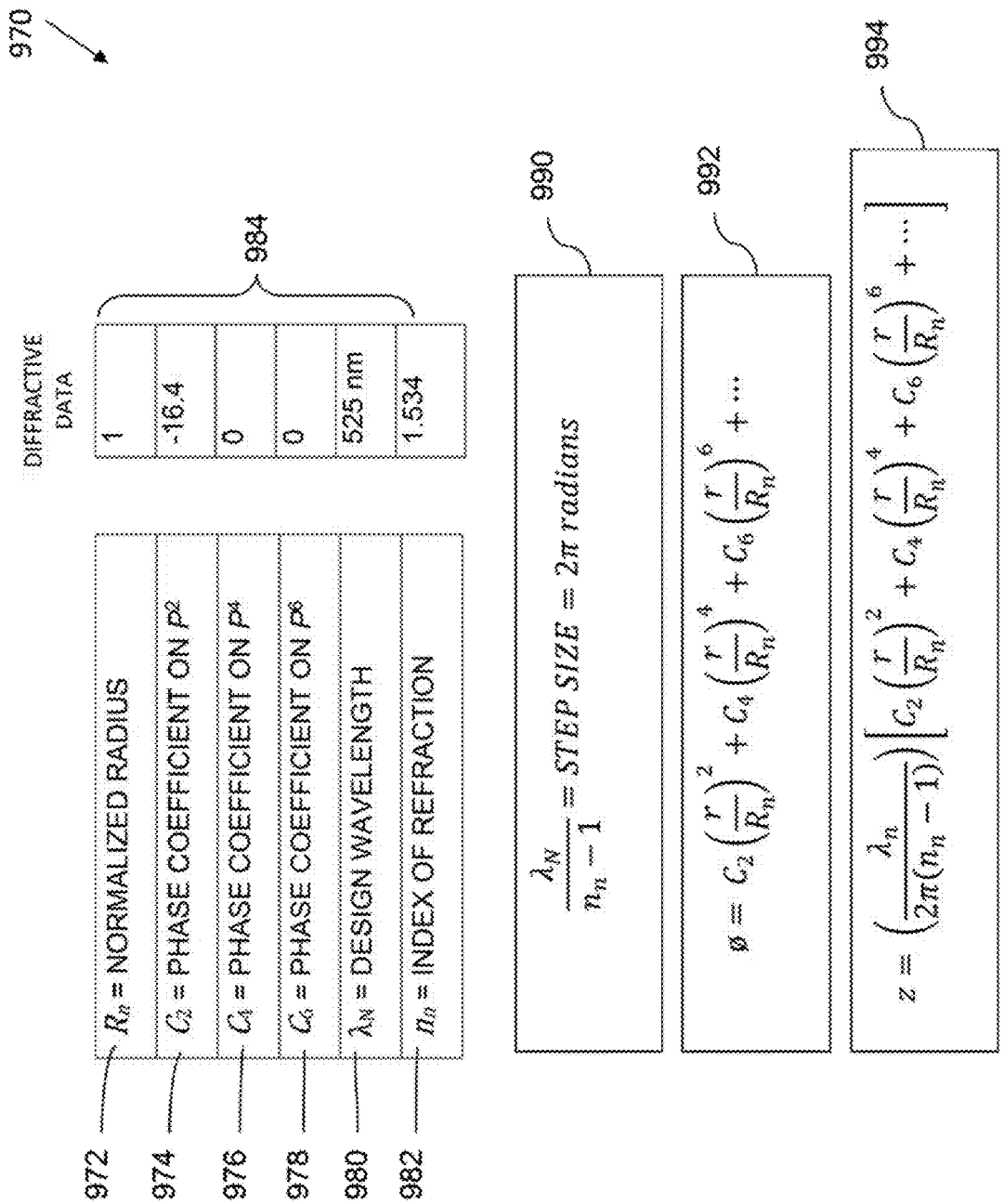

Surface number 5 is the aspherical diffractive surface characterized in part by a radius of curvature of 55 millimeters, a center thickness of 2 millimeters, and a diameter of 42 millimeters. FIG. 9D contains the data and equations used to define the diffractive surface. Normalized radius R& is shown at 974. The $C_2$ coefficient on the $p^2$ term (phase coefficient) is shown at 974. The $C_4$ coefficient on the $p^4$ term (phase coefficient) is shown at 976. The $C_6$ coefficient on the p term (phase coefficient) is shown at 978. The design wavelength $\lambda_n$ is shown at 980. The index of refraction for the lens material $n_n$ (at the design wavelength $\lambda_n$) is shown at 982. The data corresponding to 972 through 982 for the embodiment of FIG. 2 is listed in 984 where the values for the phase coefficients used with the $p^2$, $p^4$, etc. terms came from FIG. 9B. The equations for the diffractive design are shown at 990, 992, and 994. 990 is the step size which is 2 πrad (phase shift per step). 992 is the phase profile of the diffractive structure, 994 is the sag of the diffractive structure, and r is the radial coordinate. The diffractive sag structure given by 994 is superimposed on the sag of the base surface. Surface number 5 corresponds to the first surface 262 of the second lens 260 (FIG. 2) and also to the first surface 310 of the second lens 308 (FIG. 3).

Surface number 6 is the concave aspherical surface with Fresnel and is characterized in part by a radius of curvature of 60 millimeters for the aspherical curve, a dimeter of 42 millimeters, and an effective thickness of 16.5 millimeters, coefficients on the $r^2$ through $r^{16}$ terms and equation (1) above to define the Fresnel surface. Where the effective thickness is the thickness of a surface defined by Fresnel coefficients on the $r^2$ through $r^{16}$ terms that would be required to produce the same positive refractive optical power before collapsing the surface down into a Fresnel structure. The coefficients on the $r^2$ through $r^{16}$ terms used to define the Fresnel surface are shown on FIG. 9B and FIG. 9C. Surface number 6 corresponds to the second surface 264 of the second lens 260 (FIG. 2) and also to the second surface 312 of the second lens 308 (FIG. 3).

Figure 10:
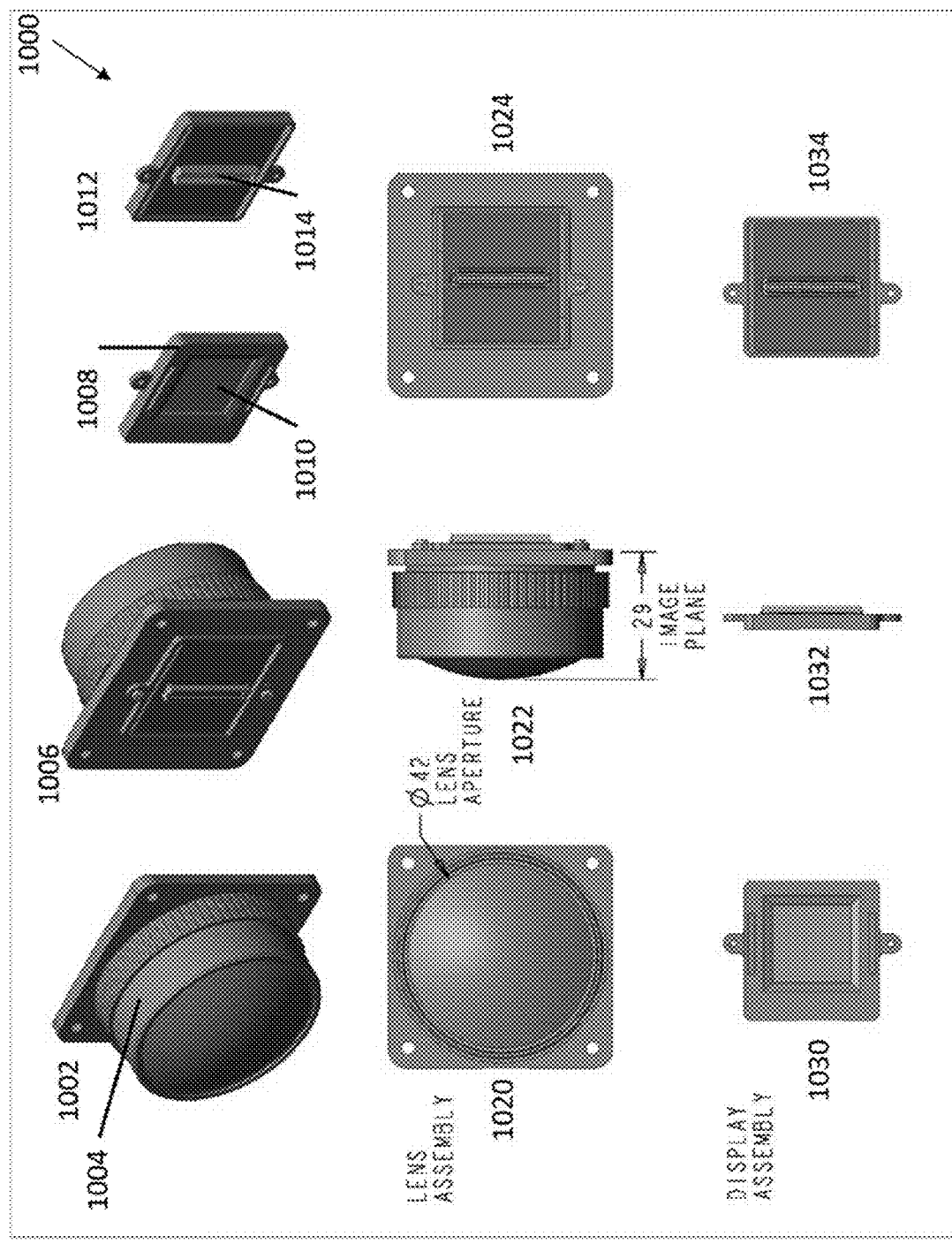
FIG. 10 illustrates an optical assembly according to embodiments of the invention.

FIG. 10 illustrates, generally at 1000, a wide field of view (WFOV) optical doublet system according to embodiments of the invention. With reference to FIG. 10, an isometric front view of a WFOV optical doublet system is illustrated at 1002. The WFOV optical doublet system 1002 uses a barrel 1004 to configure the first lens and the second lens of the optical doublet system along an optical axis of the system. The WFOV optical doublet system 1002 is configured as a monocular. However, this form factor is used merely for illustration. In other embodiments, the WFOV optical doublet system 1002 is incorporated into a binocular. Embodiments of the WFOV optical doublet system are readily configured in a headset such as a virtual reality headset.

An isometric rear view of the WFOV optical doublet system is illustrated at 1006. At 1008 a display panel is illustrated in isometric view and the display screen 1010 is visible. A corresponding rear side the display screen is shown at 1012 and an electrical connector is shown at 1014. The electrical connector 1014 functions as an input for the display panel 1008 through which electronic signals are provided that are used to create the images displayed on the display screen 1010.

A front view of the WFOV optical doublet system 1002 is shown at 1020. A side view of the WFOV optical doublet system 1002 shown at 1022. A back view of the WFOV optical doublet system 1002 is shown at 1024.

A front view of the display assembly 1008 is shown at 1030. A side view of the display assembly 1008 is shown at 1032. A back view of the display assembly 1008 is shown at 1034.

A method of manufacturing a wide field of view (WFOV) optical doublet eyepiece includes mounting in a barrel, in order from a viewer side of the eyepiece along an optical axis of the system, a first lens followed by a second lens. The first lens has a first surface that faces the viewer side of the eyepiece and a second surface that faces away from the viewer side of the eyepiece. The second lens has a first surface that faces the first lens and a second surface that faces away from the first lens. In various embodiments, the surfaces of the first and the second lenses are prepared with Fresnel and diffractive surface preparations according to the descriptions given above in conjunction with the previous description of embodiments.

A display panel is mounted to a rear end of the barrel on the optical axis. In some embodiments, the WFOV optical doublet system is provided with an adjustable diopter in other embodiments the diopter is fixed.

Embodiments of the invention can be configured with devices such as speakers, earphones, video monitors, etc. configured for use with a Bluetooth communication channel. In yet other implementations, embodiments of the invention are configured to be implemented with a wearable device, such as eye glasses, a near-to-eye (NTE) headset, a virtual reality (VR) headset or the like.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

Various general-purpose systems may be used with programs in accordance with the teachings herein, or it may prove convenient to construct more specialized apparatus to perform the required method. In other examples, embodiments of the invention as described herein can be implemented using a system on a chip (SOC), a Bluetooth chip, a digital signal processing (DSP) chip, a codec with integrated circuits (ICs) or in other implementations of hardware and software.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A wide field of view (WFOV) optical doublet system, comprising:
   a first lens, the first lens has a first surface facing a viewer side of the system and a second surface facing away from the viewer side, the first lens has a positive refractive power;
   a second lens, the second lens has a first surface facing the first lens and a second surface facing away from the first lens, the second lens has a positive refractive power; and
   a display panel, the display panel has a display surface facing the second surface of the second lens, wherein the first lens, the second lens, and the display panel are configured in order from the viewer side along an optical axis of the system, only one surface of either the first lens or the second lens is a diffractive surface and only two surfaces are Fresnel surfaces, in operation light from an image displayed on the display surface enters the system through the second surface of the second lens and is magnified and presented in a system exit pupil, the system exit pupil is on the viewer side and a field of view presented to the viewer is at least eighty (80) degrees, wherein the first surface of the first lens is a convex aspherical surface and the second surface of the first lens is a Fresnel surface, wherein the second surface of the second lens is a Fresnel surface, wherein the second surface of the second lens is an extended Fresnel surface, wherein the first surface of the second lens is a diffractive surface.

2. A wide field of view (WFOV) optical doublet system, comprising:
   a first lens, the first lens has a first surface facing a viewer side of the system and a second surface facing away from the viewer side, the first lens has a positive refractive power;
   a second lens, the second lens has a first surface facing the first lens and a second surface facing away from the first lens, the second lens has a positive refractive power; and
   a display panel, the display panel has a display surface facing the second surface of the second lens, wherein the first lens, the second lens, and the display panel are configured in order from the viewer side along an optical axis of the system, only one surface of either the first lens or the second lens is a diffractive surface and only two surfaces are Fresnel surfaces, in operation light from an image displayed on the display surface enters the system through the second surface of the second lens and is magnified and presented in a system exit pupil, the system exit pupil is on the viewer side and a field of view presented to the viewer is at least eighty (80) degrees, wherein the diffractive surface utilizes a phase coefficient $C2=-16.4$, C4 and higher phase coefficients=0, normalized radius=1, lens index of refraction of 1.534 at a design wavelength of 525 nanometers.

3. A wide field of view (WFOV) optical doublet system, comprising:
   a first lens, the first lens has a first surface facing a viewer side of the system and a second surface facing away from the viewer side, the first lens has a positive refractive power;
   a second lens, the second lens has a first surface facing the first lens and a second surface facing away from the first lens, the second lens has a positive refractive power; and
   a display panel, the display panel has a display surface facing the second surface of the second lens, wherein the first lens, the second lens, and the display panel are configured in order from the viewer side along an optical axis of the system, only one surface of either the first lens or the second lens is a diffractive surface and only two surfaces are Fresnel surfaces, in operation light from an image displayed on the display surface enters the system through the second surface of the second lens and is magnified and presented in a system exit pupil, the system exit pupil is on the viewer side and a field of view presented to the viewer is at least eighty (80) degrees, wherein an overall optical length is approximately equal to 1.7 times a back focal length of the optical doublet system.

4. A wide field of view (WFOV) optical doublet system, comprising:
   a first lens, the first lens has a first surface facing a viewer side of the system and a second surface facing away from the viewer side, the first lens has a positive refractive power;
   a second lens, the second lens has a first surface facing the first lens and a second surface facing away from the first lens, the second lens has a positive refractive power; and
   a display panel, the display panel has a display surface facing the second surface of the second lens, wherein the first lens, the second lens, and the display panel are configured in order from the viewer side along an optical axis of the system, only one surface of either the first lens or the second lens is a diffractive surface and only two surfaces are Fresnel surfaces, in operation light from an image displayed on the display surface enters the system through the second surface of the second lens and is magnified and presented in a system exit pupil, the system exit pupil is on the viewer side and a field of view presented to the viewer is at least eighty (80) degrees, wherein a center thickness of the first lens along the optical axis is d1, a space between the first lens and the second lens along the optical axis is d2, a center thickness of the second lens along the optical axis is d3, a sum of d1 plus d2 plus d3 is approximately 0.58 F, where F is an effective forward focal length of the system.

5. A wide field of view (WFOV) optical doublet system, comprising:
   a first lens, the first lens has a first surface facing a viewer side of the system and a second surface facing away from the viewer side, the first lens has a positive refractive power;
   a second lens, the second lens has a first surface facing the first lens and a second surface facing away from the first lens, the second lens has a positive refractive power; and
   a display panel, the display panel has a display surface facing the second surface of the second lens, wherein the first lens, the second lens, and the display panel are configured in order from the viewer side along an optical axis of the system, only one surface of either the first lens or the second lens is a diffractive surface and only two surfaces are Fresnel surfaces, in operation light from an image displayed on the display surface enters the system through the second surface of the second lens and is magnified and presented in a system exit pupil, the system exit pupil is on the viewer side and a field of view presented to the viewer is at least eighty (80) degrees, wherein a diameter of the first lens is approximately 42 millimeters, a diameter of the second lens is approximately 42 millimeters, a gap between the second surface of the first lens and the first surface of the second lens is approximately 2 millimeters, a diagonal dimension of the display surface is approximately 25 millimeters, an eye relief is approximately 15 millimeters, an overall optical system length is approximately 29 millimeters, a back focal length is approximately 17.0 millimeters, an effective forward focal length is approximately 20.6 millimeters, a system exit pupil is approximately 10 millimeters.

6. A wide field of view (WFOV) eyepiece to display an image from a display panel to a viewer, comprising:
a first lens, the first lens has a first surface facing a viewer side of the eyepiece and a second surface facing away from the viewer side, the first lens has a positive refractive power;
a second lens, the second lens has a first surface facing the first lens and a second surface facing away from the first lens, the second lens has a positive refractive power; the first lens followed by the second lens are configured in order from the viewer side along an optical axis of the system, one surface of either the first lens or the second lens is a diffractive surface and two surfaces are Fresnel surfaces, in operation light from an image displayed on the display panel is magnified and presented in a system exit pupil, wherein the second surface of the first lens is a Plano Fresnel surface, wherein the second surface of the second lens is concave and has a positive refractive power, wherein the first surface of the second lens is a diffractive surface.

7. A wide field of view (WFOV) eyepiece to display an image from a display panel to a viewer, comprising:
a first lens, the first lens has a first surface facing a viewer side of the eyepiece and a second surface facing away from the viewer side, the first lens has a positive refractive power;
a second lens, the second lens has a first surface facing the first lens and a second surface facing away from the first lens, the second lens has a positive refractive power; the first lens followed by the second lens are configured in order from the viewer side along an optical axis of the system, one surface of either the first lens or the second lens is a diffractive surface and two surfaces are Fresnel surfaces, in operation light from an image displayed on the display panel is magnified and presented in a system exit pupil, wherein a center thickness of the first lens along the optical axis is d1, a space between the first lens and the second lens along the optical axis is d2, a center thickness of the second lens along the optical axis is d3, a sum of d1 plus d2 plus d3 is approximately 0.58 F, where F is an effective forward focal length of the system.

8. A wide field of view (WFOV) eyepiece to display an image from a display panel to a viewer, comprising:
a first lens, the first lens has a first surface facing a viewer side of the eyepiece and a second surface facing away from the viewer side, the first lens has a positive refractive power;
a second lens, the second lens has a first surface facing the first lens and a second surface facing away from the first lens, the second lens has a positive refractive power; the first lens followed by the second lens are configured in order from the viewer side along an optical axis of the system, one surface of either the first lens or the second lens is a diffractive surface and two surfaces are Fresnel surfaces, in operation light from an image displayed on the display panel is magnified and presented in a system exit pupil, wherein the first lens and the second lens are approximately 42 millimeters in diameter the effective focal length is approximately 20 millimeters, a field of view is approximately 80 degrees, and the eyepiece is mounted in a virtual reality device.

9. A wide field of view (WFOV) eyepiece, to magnify and present an image from a display panel to a viewer, comprising, in order along an optical axis of the eyepiece,
a first lens having positive refractive power and a second lens having positive refractive power,
the first lens and the second lens form an optical doublet, the first lens has a first surface facing a viewer side of the eyepiece and a second surface facing away from the viewer side, the second lens has a first surface facing the first lens and a second surface facing away from the first lens,
the first surface of the first lens is convex aspherical, the second surface of the first lens is a Fresnel surface, the first surface of the second lens is a diffractive convex aspherical surface and the second surface of the second lens is a concave aspherical Fresnel surface, in operation light from an image displayed on the display panel enters the eyepiece through the second surface of the second lens and is magnified and presented in a system exit pupil, the system exit pupil is located on the viewer side of the first lens.

10. The WFOV eyepiece of claim 9, wherein the second surface of the first lens is plano Fresnel.

11. The WFOV eyepiece of claim 9, wherein the second surface of the second lens is extended Fresnel.

12. The WFOV eyepiece of claim 9, wherein the first surface of the second lens utilizes a diffractive structure with a phase coefficient C2=−16.4, C4 and higher phase coefficients=0, normalized radius=1, lens index of refraction of 1.534 at a design wavelength of 525 nanometers.

13. The eyepiece of claim 12, wherein a field of view is approximately 80 degrees.

14. A method for manufacturing a wide field of view (WFOV) optical doublet eyepiece, comprising:
mounting in a barrel, in order along an optical axis, a first lens, the first lens has a first surface facing a viewer side of the eyepiece and a second surface facing away from the viewer side and the first lens has a positive refractive power, a second lens, the second lens has a first surface facing the first lens and a second surface facing away from the first lens and the second lens has a positive refractive power, wherein one surface of either the first lens or the second lens is a diffractive surface; and two surfaces of the eyepiece are Fresnel surfaces, wherein the eyepiece provides approximately an eight (80) degree field of view through a system exit pupil, wherein the first surface of the first lens is a convex aspherical surface and the second surface of the first lens is a Fresnel surface, wherein the second surface of the second lens is a Fresnel surface, wherein the second surface of the second lens is concave and has a positive refractive power.

15. A method for manufacturing a wide field of view (WFOV) optical doublet eyepiece, comprising:
mounting in a barrel, in order along an optical axis, a first lens, the first lens has a first surface facing a viewer side of the eyepiece and a second surface facing away from the viewer side and the first lens has a positive refractive power, a second lens, the second lens has a first surface facing the first lens and a second surface facing away from the first lens and the second lens has a positive refractive power, wherein one surface of either the first lens or the second lens is a diffractive surface; and two surfaces of the eyepiece are Fresnel surfaces, wherein the eyepiece provides approximately an eight (80) degree field of view through a system exit pupil, wherein the first surface of the first lens is a convex aspherical surface and the second surface of the first lens is a Fresnel surface, wherein the second surface of the second lens is a Fresnel surface, wherein the first surface of the second lens is the diffractive surface.

16. A method for manufacturing a wide field of view (WFOV) optical doublet eyepiece, comprising:
mounting in a barrel, in order along an optical axis, a first lens, the first lens has a first surface facing a viewer side of the eyepiece and a second surface facing away from the viewer side and the first lens has a positive refractive power, a second lens, the second lens has a first surface facing the first lens and a second surface facing away from the first lens and the second lens has a positive refractive power, wherein one surface of either the first lens or the second lens is a diffractive surface; and two surfaces of the eyepiece are Fresnel surfaces, wherein the eyepiece provides approximately an eight (80) degree field of view through a system exit pupil, wherein the diffractive surface utilizes a diffractive structure with a phase coefficient $C2=-16.4$, $C4$ and higher phase coefficients=0, normalized radius=1, lens index of refraction of 1.534 at a design wavelength of 525 nanometers.

17. A method for manufacturing a wide field of view (WFOV) optical doublet eyepiece, comprising:
mounting in a barrel, in order along an optical axis, a first lens, the first lens has a first surface facing a viewer side of the eyepiece and a second surface facing away from the viewer side and the first lens has a positive refractive power, a second lens, the second lens has a first surface facing the first lens and a second surface facing away from the first lens and the second lens has a positive refractive power, wherein one surface of either the first lens or the second lens is a diffractive surface; and two surfaces of the eyepiece are Fresnel surfaces, wherein the eyepiece provides approximately an eight (80) degree field of view through a system exit pupil, wherein a center thickness of the first lens along the optical axis is d1, a space between the first lens and the second lens along the optical axis is d2, a center thickness of the second lens along the optical axis is d3, a sum of d1 plus d2 plus d3 is approximately 0.58 F.

18. The method of claim 17, further comprising:
mounting a diopter correction mechanism to a front end of the barrel.

19. A method for manufacturing a wide field of view (WFOV) optical doublet eyepiece, comprising:
mounting in a barrel, in order along an optical axis, a first lens, the first lens has a first surface facing a viewer side of the eyepiece and a second surface facing away from the viewer side and the first lens has a positive refractive power, a second lens, the second lens has a first surface facing the first lens and a second surface facing away from the first lens and the second lens has a positive refractive power, wherein one surface of either the first lens or the second lens is a diffractive surface; and two surfaces of the eyepiece are Fresnel surfaces, wherein the eyepiece provides approximately an eight (80) degree field of view through a system exit pupil;
mounting to a rear end of the barrel, a display panel on the optical axis, a display surface of the display panel faces the second surface of the second lens, in operation light from an image displayed on the display surface enters the eyepiece through the second surface of the second lens and is magnified and presented in a system exit pupil, the system exit pupil is on the viewer side, wherein a diameter of the first lens is approximately 42 millimeters, a diameter of the second lens is approximately 42 millimeters, a gap between the second surface of the first lens and the first surface of the second lens is approximately 2 millimeters, a diagonal dimension of the display surface is approximately 25 millimeters, an eye relief is approximately 15 millimeters, an overall optical system length is approximately 29 millimeters, a back focal length is approximately 17.0 millimeters, an effective forward focal length is approximately 20.6 millimeters, the system exit pupil is approximately 10 millimeters.

* * * * *